Feb. 25, 1964   R. T. MADDING   3,122,135
STEAM COOKER
Filed May 22, 1959

Robert T. Madding
INVENTOR.
BY *Clarence A. O'Brien*
*and Harvey B. Jacobson*
Attorneys

3,122,135
STEAM COOKER
Robert T. Madding, 1115 Jackson, Amarillo, Tex.
Filed May 22, 1959, Ser. No. 815,155
1 Claim. (Cl. 126—377)

This invention relates to electric cooking equipment and more particularly to a novel cooking device wherein conventional pots may be heated by steam rather than heated by water or the application of direct heat.

It is well known that in order to prevent undesirable scorching of pots and other kitchen utensils, double boilers may be utilized wherein pots are partially submerged in water which is in turn heated to boiling for transmitting heat to the pot and food carried therein. Of course, the utilization of double boilers has proved extremely satisfactory but however, it has been found that the employment thereof usually is not neat inasmuch as when the pot is removed from the boiled water, it often drips onto the floor or such and therefore, the double boiler has acquired only limited use.

In consideration of the above, it is the principal object of this invention to provide a novel cooking device wherein scorching of a pot is prevented without the necessity of submerging the pot in water and accordingly it is thought that the disadvantages of the double boiler are obviated.

It is a more particular object of this invention to provide a novel construction in cooking devices wherein a container is provided for accommodating a quantity of water therein. The container is adapted to be heated by a conventional gas flame or electric heating coil to a point where the water boils to generate steam. An aperture is provided in the top container surface and the pot sits thereabove, substantially sealing the aperture. The steam resulting from the heated water then contacts the pot for properly heating the food therein.

It is a still further object of this invention to provide a novel cooking device which is simple in construction and accordingly inexpensive to manufacture. Also, it will be apparent from the following that the device is durable and extremely easy to utilize.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
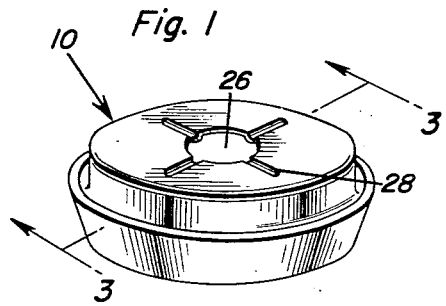
FIGURE 1 is a perspective view of a first form of the invention.
Figure 3:
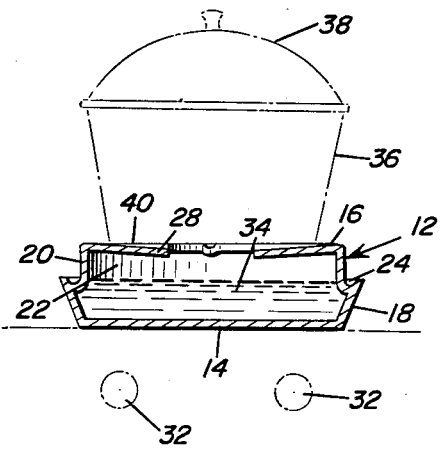
FIGURE 3 is a sectional view taken substantially along the plane 3—3 of FIGURE 1 illustrating in phantom lines the use of the cooking device.

With continuing reference to the drawings and initial reference to FIGURES 1 and 3, numeral 10 generally represents the cooking device comprising this invention. A container generally designated as 12 includes a flat bottom surface 14 and a flat top surface 16. Integrally formed with and extending from the bottom surface 14 is a conical side surface 18 which mates with a depending flange 20 integrally formed with the top surface 16 for enclosing of volume 22. It will be noted that the depending flange 20 terminates in a U-shaped portion providing a drip trough 24. The depending flange 20 and conical surface 18 may be sealed in any efficient manner desired. Of course, the seal must be such that water or steam will not escape therethrough.

An aperture 26 is defined in the top surface 16 and a plurality of radial depressed portions 28 extend outwardly therefrom. The depressed portions 28 are, as illustrated in FIGURE 3, inclined outwardly from the aperture 26.

In the utilization of the first form of the invention, the container 12 is set on a conventional stove or such 30 having controls 32 and a quantity of water 34 is received through the aperture 26 into the volume 22 defined by the top surface 16, bottom surface 14, conical surface 18 and depending flange 20. A conventional pot 36 which may be covered by cover 38 is then placed on the top surface 16. It will be apparent that as the water 34 is heated, steam will be generated which will be transmitted to the pot 36 to cook food therein. In order that excessive pressure is not created within the container 12, it is to be seen that the depressed portions 28 provide small paths for the escape of steam from the volume 22 beneath the pot 36 and to the surrounding air. It will be appreciated that the pot 36 is apparently not submerged in water and it will also be seen that any condensation which may form on the bottom surface 40 of the pot is likely to fall and roll downwardly in the depressed portions 28 to return to the water quantity 34.

Figure 2:
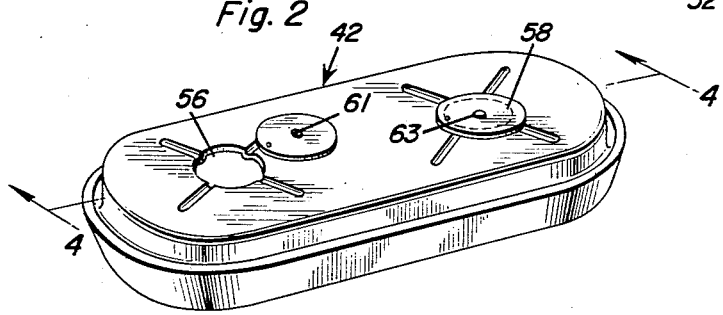
FIGURE 2 is a perspective view of a second form of the invention.
Figure 4:
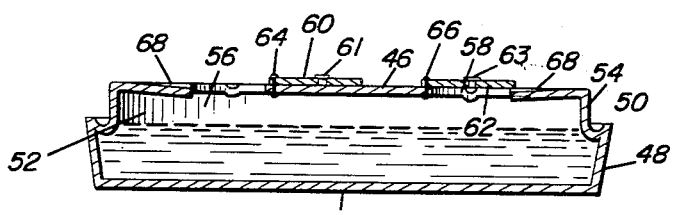
FIGURE 4 is a sectional view taken substantially along the plane 4—4 of FIGURE 2.

Attention is now drawn to the second form of the invention particularly illustrated in FIGURES 2 and 4. A similar container 42 is illustrated having a flat bottom surface 44 and top surface 46. Again, a conical surface 48 and depending flange 50 are mated to form a volume 52 for the accommodation of a quantity of water 54 received through apertures 56 and 58 defined in the top surface 46 of the cooking device. It will be appreciated that the teachings of this invention need not be confined to devices formed with only one or two apertures as in FIGURE 1 and FIGURE 2 but any number of apertures may be utilized as desired.

To allow for a single aperture to be used when only one pot of food is being cooked, sealing means for each aperture are provided in the form of horizontal plates 60 and 62 which are pivoted to the top surface 46 by vertical pivot pins 64 and 66. The necessity of the plates forming the sealing means where more than one aperture is utilized is thought to be apparent. For example when one pot is covering aperture 56, it is of course a necessity to substantially seal aperture 58 so that steam will not freely escape therethrough. Relief valves 61 and 63 may be provided as illustrated for the purpose of preventing the excessive build-up of steam within the container. The valves may be somewhat biased though, so that the escape of steam is limited whereby a greater than boiling point temperature may be transferred to the pot.

Similarly to the form of the invention illustrated in FIGURES 1 and 3, a plurality of radial depressed portions 68 are provided in the top surface 46. The depressed portions 68 are inclined away from the apertures 56 and 58 and accordingly serve the same function as explained above for the form of the invention illustrated in FIGURES 1 and 3.

From the foregoing, it will be appreciated that herein has been provided a simple cooking device which allows for the efficient cooking of food by steam rather than by water or direct heat contact.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A steam generating device for heating cooking vessels, said device comprising a water container for mounting on a heater and including integral upper and lower portions, said lower portion comprising a flat bottom and an upwardly and outwardly inclined wall, said upper portion for receiving thereon a vessel to be heated and including a generally flat top and a vertical wall depending therefrom into the first-named wall and joined thereto, the second-named wall, at the juncture thereof with said first-named wall, defining an endless drip trough around the container, said top having a circular opening therein for the passage of steam to the vessel, said top including outwardly tapered vent troughs radiating from the opening.

References Cited in the file of this patent

UNITED STATES PATENTS

| | | |
|---|---|---|
| 612,513 | Bowers | Oct. 18, 1898 |
| 843,698 | Redwood | Feb. 12, 1907 |
| 1,101,926 | Hartmann | June 30, 1914 |
| 1,722,221 | Hutchison | July 23, 1929 |
| 1,810,860 | Tremblay | June 16, 1931 |
| 1,828,806 | Kania | Oct. 27, 1931 |
| 2,428,996 | Schworm | Oct. 14, 1947 |